April 25, 1961 V. C. KENNEDY, JR 2,981,587

PUNCH TAPE RECORDER

Filed April 21, 1958

INVENTOR:
Verne C. Kennedy Jr.,
BY Bair-Freeman & Molinare
ATTORNEYS.

United States Patent Office 2,981,587
Patented Apr. 25, 1961

2,981,587

PUNCH TAPE RECORDER

Verne C. Kennedy, Jr., Norman, Okla., assignor to Streeter-Amet Company, Grayslake, Ill., a corporation of Illinois Filed Apr. 21, 1958, Ser. No. 729,873

5 Claims. (Cl. 346—93)

This invention relates to a punch tape recorder and more particularly to an apparatus for recording digital information by punching holes in a moving tape.

There are numerous applications in which it is desirable to record numerical or digital information and to read out or convert such recorded information at a subsequent time and it is to this type of apparatus that the present invention specifically relates. One very desirable application for the invention is in the counting of traffic. In such applications, the traffic is counted by a detecting means which may be any of several conventional forms and a record is made of the count by punching holes in a moving tape of paper or the like. The punched tape may later be used to read out the information for analyses or can be converted directly to other useable forms, such as punched cards for further processing.

It is one of the objects of the invention to provide a punch tape recorder in which numerical information is recorded automatically and continuously by operating a punch in response to operation of a detecting device.

Another object is to provide a punch tape recorder in which the detecting device operates a memory unit such as a stepping switch which supplies an impulse after a pre-determined number of operations to operate the punch.

According to a feature of the invention, the memory unit is adjustable to produce impulses after different numbers of operations of the detecting device and the punch is adjustable across the width of the tape to punch holes therein in different positions corresponding to different counts.

A further object is to provide a punch tape recorder in which the tape is advanced step by step at predetermined time intervals and periodic records of the time are made on the tape.

According to a feature of the invention, the tape is punched periodically and is fed by a wheel having projections thereon engaging the punched openings which is periodically advanced by a ratchet to move the tape.

The above and other objects and features of the invention will be more readily apparent from the following description when read in connection with the accompanying drawing, in which.

Figures 1, 2, 3, 4, 5:
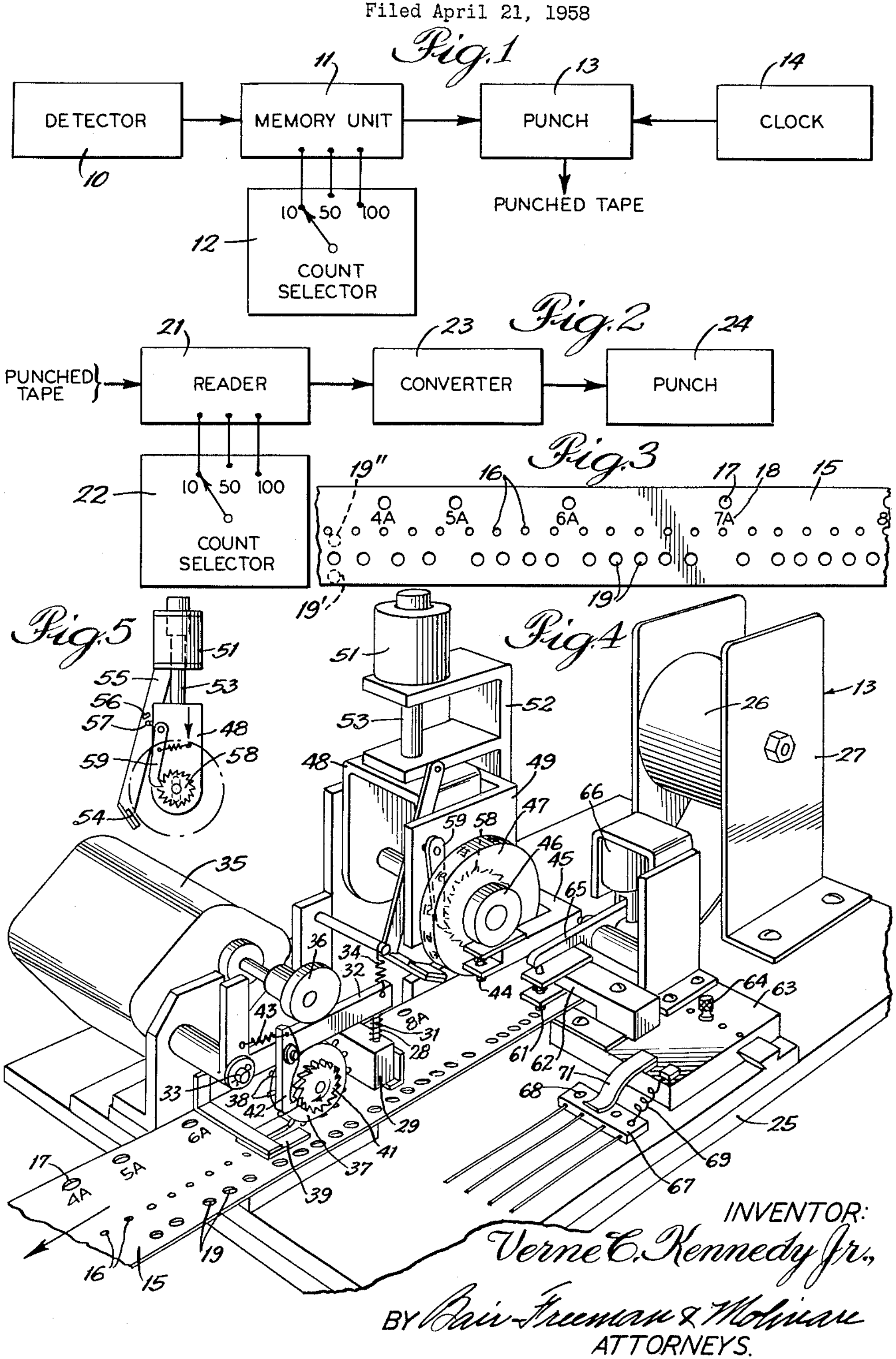
Figure 1 is a block diagram of a punch tape recorder embodying the invention.
Figure 2 is a block diagram of a read out device.
Figure 3 is a partial view of a strip of tape embodying the invention.
Figure 4 is a perspective view of the punch mechanism.
Figure 5 is a partial diagrammatic view of a portion of the punch mechanism.

The overall system, as illustrated in block diagram in Figure 1, comprises a detector 10 to count conditions or operations of which a record is to be made. For example, in using the device to record traffic counts, the detector might be either an electric or fluid unit placed in or across a traffic lane to be operated each time a vehicle passes in the traffic lane. Pulses developed by the detector unit either electrically or by fluid are transmitted to a memory unit 11 which may be a conventional stepping switch to advance one step in response to each pulse of the detector unit. The memory unit includes a count selector 12 which is adjustable to provide an impulse from the memory unit after a predetermined number of operations of the detector. The count selector might be a switching mechanism to select different switching circuits in the stepping switch memory unit to produce an electrical impulse after different numbers of steps of the stepping switch have occurred. As shown, the count selector may be adjusted to produce an impulse after 10, 50 or 100 operations of the detector, although different count selections could obviously be made for different types of operations.

The memory unit supplies the impulses to a punch unit 13 which operates to punch a moving tape, such as a paper tape, or the like. The punch unit is controlled by the memory unit and by a time responsive unit, such as a clock 14, which advances the tape and also preferably makes a printed time record on the tape.

A typical section of tape is illustrated at 15 in Figure 3 and may consist of an elongated strip of paper or the like which is capable of having holes punched therein readily and which will also receive and retain an imprint, such as a time indication. As shown, the tape is formed in its central portion with a series of uniformly punched openings 16 which serve as feed openings. Adjacent to one edge, the tape is punched with openings 17 which may correspond with predetermined time intervals, such as one hour, and adjacent to which a time indication may be imprinted, as indicated at 18.

Adjacent to the opposite edge of the tape it is punched with a series of holes 19 representing digital counts corresponding to operations of the detector. The openings 19 are produced by operation of the punch 13 after accumulation in the memory unit of a preset number of operations of the detector. As described more fully hereinafter, the punch which forms the openings 19 is adjustable across the width of the tape so that the openings 19 can be produced at different positions in the width of the tape corresponding to different counts. For example, when the openings in the tape are produced in the position shown at 19′ each opening might represent a count of 10 when the count selector is set at 10 and when the openings are in the position indicated at 19″, each opening might represent a count of 100 when the count selector is set at 100 with the openings 19 in the central position, as shown in solid lines representing a count of 50.

The tape after being formed may be read out or used in a number of different ways. For many applications, it is desirable to convert the information to punched cards for which use an apparatus, as illustrated in block diagram in Figure 2, might be employed. In this apparatus, the tape is fed into a reader 21 which may be adjusted through a count selector 22 to produce a read out impulse corresponding to the same number of detecting units as that for which the count selector in the recorder is set. Impulses from the reader may be supplied to a converter 23 by which they are converted into the desired time and count impulses to operate a punch 24 for punching standard cards. If desired, the information on the tape may be read out in other forms for direct analysis and use.

The punch 13 is illustrated more particularly in Figure 4 with the tape being shown in place therein. The punch apparatus, as shown, comprises a base 25 on which a spool of tape 26 may be supported at one end in brackets 27 to be fed through the apparatus. A take-up spool, not shown, may be provided at the other end of the base to wind up the tape after it has passed through the apparatus and has been punched. The tape is fed in a straight line through the apparatus being guided by suitable guiding means to pass therethrough and to be punched as desired.

The holes 16 in the tape are formed by a punch 28 supported for vertical movement toward and through the tape and guided by a block 29. The punch 28 is normally urged upwardly by a spring 31 and is adapted to be moved down by a lever 32 pivoted on a fixed pivot 33. The lever is normally held in an elevated position, as shown by a spring 34, and is moved down to punch one of the openings 16 in the tape by a mechanism shown as a rotary electric motor 35 driving a cam 36 which engages the lever 32. With the motor in its normal rest position the low side of the cam engages the lever 32 so that it is elevated and when the motor is energized it will turn through a single revolution to force the lever downward and to punch one of the openings 16 in the tape.

Movement of the lever 32 is also utilized to operate a feeding mechanism for the tape to feed it step-by-step through a punching apparatus. The feeding mechanism as shown, comprises a wheel 37 formed with a plurality of pins 38 projecting from its periphery and spaced to interfit with the holes 16. The tape is held down by a slotted stripper plate 39 so that it will not be lifted by engagement of the pins 38 therewith and so that it will be advanced properly through the punching apparatus as wheel 37 is turned.

A ratchet wheel 41 is secured to the wheel 39 and is provided with spaced teeth corresponding in number and angular spacing to the pins 38. The ratchet wheel is engaged by a pawl 42 pivoted on the lever 32 and urged into engagement with the ratchet wheel by a spring 43. Each time the lever 32 is moved downward the pawl will move with it to engage a tooth on the ratchet wheel and as the lever rises the pawl will move upward to turn the ratchet wheel and the feed wheel 37 through one step. In this way the tape is accurately advanced in uniform steps.

The time indicating holes 17 are punched in the tape by a punch 44 supported by a guide bracket 45 and normally urged to an upper position by a spring. The punch 44 is moved downward to form the holes 17 by engagement therewith of an enlarged hub 46 on a printing wheel 47. The printing wheel is supported for rotation on a yoke 48 which is mounted for vertical sliding in a guide 49. The printing wheel is formed on its periphery with raised time indicia characters to print the indicia 18 on the tape each time the wheel is lowered. To lower the wheel a solenoid 51 mounted on a bracket 52 in which the yoke 48 might be guided is connected to the yoke through a rod 53. When the solenoid is energized the rod 53 and yoke 48 will be moved downward into engagement with the paper to print a time indicium thereon.

The printing wheel may be inked in any desired manner, but as best seen in Figure 5 is engaged by an inking pad 54 carried by a pivoted arm 55 which is pivoted on the bracket 52. The inking pad normally occupies a position spaced from the wheel, as shown in Figures 4 and 5, and may be moved into engagement with the wheel by a cam member 56 on the arm which is engaged by a pin 57 carried by the yoke 48. As the yoke moves down the pin 57 will engage the cam 56 and swing the inking pad into contact with the periphery of the wheel to ink the raised characters thereon. The wheel is turned through one step after each operation thereof to correctly register on the tape the proper time. For this purpose, the wheel 47 carries a ratchet wheel 58 which is engaged by a pawl 59 pivoted on the fixed guide 49. As the wheel is moved downward the pawl will slip over one tooth thereof so that when the wheel is again raised the pawl will turn it through one step. It will be appreciated that the indicium on the wheel corresponds to the time interval between its operations which, as illustrated, is one hour. The solenoid 51 is energized through the clock 14 at intervals of one hour to punch the holes 17 in the tape and to print the corresponding time indicium thereon.

The count holes 19, 19′ or 19″ are punched in the tape by a punch 61 supported in a guide bracket 62 which is carried by a plate 63. The plate is slidably mounted on the base 25 for movement transversely of the tape and may be locked in selected position by a locking pin 64. By sliding the plate 63 one way or the other, the position of the count holes to correspond to 10, 50 or 100 units of count may be selected.

The punch 16 is normally urged upward by a spring and is moved down to form the punch holes by a pivoted arm 65 which engages the top of the punch at one end and which is connected at its opposite end to a solenoid 66. Each time the solenoid is energized the punch 61 will be operated to punch one of the count holes.

In order to select automatically the correct position of the count holes for different values of count an automatic switching mechanism is provided. As shown, the mechanism comprises a contact bar 67 having three spaced contacts 68 thereon and having a fourth contact connected by a flexible lead 69 to a terminal on the base 63. The contacts 68 are adapted to be selectively engaged by a wiper 71 carried by the base 63 and selectively engaging the different contacts 68 as the base 63 is slid to different positions corresponding to the different desired counts. Thus in the position shown the wiper 71 engages the center contact 68 to punch holes 19 corresponding to a unit count of 50. As the base 63 is slid to different positions to register counts of 10 or 100 the wiper will engage the corresponding one of the contacts 68 so that the solenoid 66 will be energized whenever a circuit is completed between the flexible lead 69 and the wiper 71.

The several leads from the contacts 68 may be connected to the stepping switch memory unit at different positions thereof so that circuits will be completed between the common lead and the different leads to the contacts 68 after different numbers of operations of the stepping switch. By this mechanism, a single simple adjustment of the position of the base 63 serves not only to vary the spacing of the count holes, but also serves automatically as the count selector for the memory unit to adjust it to produce an impulse after different numbers of unit operations.

In operation a detector, such as an electrical sensing unit or a fluid tube, or the like, may be placed in a position to produce a pulse each time a vehicle crosses it or each time another operation to be counted occurs. The detector unit is connected to a stepping switch memory unit which is in turn electrically connected through the selector switch mechanism described above to the solenoid 66. The clock unit is started and the printing wheel 47 is adjusted to correspond to the existing time.

At periodic intervals, such as one hour, the solenoid 51 will be energized through the clock unit to move the printing wheel 47 downward to make a time imprint and also to operate the punch 44 to punch one of the holes 17. Simultaneously the clock unit will energize the motor 35 which will turn through a single revolution to operate the punch 28 to punch one of the holes 16 and to turn the feed wheel 37 to advance the tape through one step.

After a predetermined count has been fed to the memory unit by the detector the solenoid 66 will be energized to punch one of the count holes. The memory unit will simultaneously energize the motor 35 to cause the punch 28 to punch one of the holes 16 and to turn the feed wheel 37 to advance the tape through one step. As will be seen in the example of a typical tape shown in Figure 3, the time indicating holes 17 may be spaced erratically along the tape length. The spacing of these holes relative to the count holes 19 will indicate density of the count in relation to time. Thus the tape not only provides a total count, but will also indicate a time distribution of the count.

While one embodiment of the invention has been shown and described herein, it will be understood that it is illustrative only and not to be taken as a definition of the scope of the invention, reference being had for this purpose to the appended claims.

What is claimed is:

1. A punch tape recorder comprising means to guide a strip of perforable tape along a predetermined path, means to advance the tape periodically in uniform steps at uniform time intervals along said path, a punch to punch openings in the tape, detecting means operable in response to units in a value to be recorded, a memory unit connected to the detecting means and operable to produce an impulse after a predetermined number of operations of the detecting means, means connected to the memory unit and operable by said impulses to actuate the punch, means mounting the punch for adjustment transversely of the tape, a plurality of output circuits for the memory unit to supply impulses after different numbers of operations of the detecting means and which terminate in contacts adjacent to the punch spaced at right angles to the length of the tape, and a contactor carried by the punch and movable therewith and selectively engageable with said contacts as the punch is adjusted.

2. A punch tape recorder comprising means to guide a strip of perforable tape along a predetermined path, a punch to punch openings in the tape, a feed wheel having projections thereon engaging the openings, means controlling the punch and the feed wheel, time responsive means periodically to operate the controlling means to actuate the punch and to turn the feed wheel through an angular step at uniform time intervals, a second punch to punch count indicating openings in the tape, detecting means operable in response to units in a value to be indicated, a memory unit connected to the detecting means and operating to produce an impulse after a predetermined number of operations of the detecting means, and means connected to the memory unit and operable by said impulse to operate the controlling means and the second punch.

3. The recorder of claim 2 in which the memory unit is adjustable to produce impulses after different numbers of operations of the operating means and the second punch is simultaneously adjustable across the width of the tape to punch the count indicating openings in different positions on the tape corresponding to said different numbers of operations of the operating means.

4. The recorder of claim 2 including a third punch, a time printer, and means operated by said time responsive means periodically to operate the third punch and the time printer.

5. A tape recorder comprising means to guide a strip of tape capable of receiving a record along a predetermined path, means to advance the tape periodically in uniform steps at uniform time intervals along said path, recording means to form periodic recordings on the tape, detecting means operable in response to units in a value to be recorded, a memory unit connected to the detecting means and operable to produce an impulse after a predetermined number of operations of the detecting means, means connected to the memory unit and operable by said impulses to actuate the recording means, means mounting the recording means for adjustment transversely of the tape, a plurality of output circuits for the memory unit to supply impulses after different numbers of operations of the detecting means and which terminate in contacts adjacent to the recording means spaced at right angles to the length of the tape, and a contactor carried by and movable with the recording means and selectively engageable with said contacts as the recording means is adjusted.

References Cited in the file of this patent

UNITED STATES PATENTS

| | | |
|---|---|---|
| 651,856 | Hill | June 19, 1900 |
| 1,551,220 | Scheffler | Aug. 25, 1925 |
| 2,330,872 | Diebold | Oct. 5, 1943 |
| 2,333,758 | Xenis et al. | Nov. 9, 1943 |
| 2,352,925 | Walker | July 4, 1944 |
| 2,354,768 | Nokes | Aug. 1, 1944 |
| 2,517,316 | Holmes | Aug. 1, 1950 |
| 2,704,400 | Baldocchi | Mar. 22, 1955 |
| 2,779,590 | Seastrom | Jan. 29, 1957 |

FOREIGN PATENTS

| | | |
|---|---|---|
| 525,074 | Belgium | Dec. 1, 1953 |